US008184416B2

(12) United States Patent
Choi et al.

(10) Patent No.: US 8,184,416 B2
(45) Date of Patent: May 22, 2012

(54) INVERTER DRIVER AND LAMP DRIVER THEREOF

(75) Inventors: Jae-Soon Choi, Seoul (KR); Dong-Hun Lee, Bucheon (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 474 days.

(21) Appl. No.: 12/220,559

(22) Filed: Jul. 25, 2008

(65) Prior Publication Data

US 2009/0034138 A1 Feb. 5, 2009

(30) Foreign Application Priority Data

Aug. 3, 2007 (KR) ........................ 10-2007-0078072

(51) Int. Cl.
*H02H 3/20* (2006.01)
*H02H 9/04* (2006.01)

(52) U.S. Cl. .............. 361/78; 361/79; 361/90; 361/91.1

(58) Field of Classification Search .................... 361/78, 361/79, 90, 91.1
See application file for complete search history.

(56) References Cited

U.S. PATENT DOCUMENTS 3,386,028 A * 5/1968 Legatti ............................ 363/96
5,930,121 A 7/1999 Henry
6,107,750 A * 8/2000 Moisin .......................... 315/219
6,114,814 A 9/2000 Shannon et al.
6,259,615 B1 7/2001 Lin
6,316,881 B1 11/2001 Shannon et al.
6,396,722 B2 5/2002 Lin
6,522,110 B1 * 2/2003 Ivanov .......................... 323/267
6,804,129 B2 10/2004 Lin
6,809,938 B2 10/2004 Lin et al.
6,856,519 B2 2/2005 Lin et al.
6,900,993 B2 5/2005 Lin et al.
7,119,521 B2 * 10/2006 Ishii et al. ..................... 323/222
7,332,871 B2 * 2/2008 Lu ................................. 315/247
7,915,877 B2 * 3/2011 Meier et al. ................... 323/267
2006/0220595 A1 10/2006 Lu

FOREIGN PATENT DOCUMENTS

KR 1020020060842 A 7/2002
KR 1020060020927 A 3/2006

OTHER PUBLICATIONS

Integrated Circuit, on-line article in Wikipedia, http://en.wikipedia.org/wiki/Integrated_circuit.*
"Enhanced Multi-Mode CCFL Controller," Production Data Sheet for LX1691A, Microsemi, Rev. 1.1b, Aug. 30, 2006, pp. 1-2.
"Full Bridge Resonant CCFL Controller," Production Data Sheet for LX1692A, Microsemi, Rev. 1.1, Feb. 27, 2006, pp. 1-2.
"Full Bridge CCFL Controller," MP1038, Monolithic Power Systems, Rev. 1.4, Oct. 2007, pp. 1-11.

* cited by examiner

*Primary Examiner* — Rexford Barnie
*Assistant Examiner* — Zeev V Kitov
(74) *Attorney, Agent, or Firm* — Sidley Austin LLP

(57) ABSTRACT

An inverter driver controls an inverter that supplies driving voltages to a plurality of discharge lamps. The inverter driver senses the abnormal operation of the plurality of discharge lamps based on a plurality of first feedback voltages corresponding to the plurality of driving voltages supplied to the discharge lamps and a plurality of second feedback voltages corresponding to the current flowing through the plurality of discharge lamps. The inverter driver is formed in a single integrated circuit.

12 Claims, 4 Drawing Sheets

INVERTER DRIVER AND LAMP DRIVER THEREOF

CROSS-REFERENCE TO RELATED APPLICATION

This application claims priority to and the benefit of Korean Patent Application No. 10-2007-0078072 filed in the Korean Intellectual Property Office on Aug. 3, 2007, the entire contents of which are incorporated herein by reference.

BACKGROUND

1. Field of the Invention

The present invention relates to an inverter driver and a lamp driver having the same. More particularly, the present invention relates to a protection circuit in an inverter driver, and a lamp driver having the same.

2. Description of the Related Art

In general, an inverter for an LCD backlight is a DC/AC transformer for generating a high voltage to turn on a cold cathode discharge lamp. After converting the DC power to AC power, the inverter drives a discharge lamp using a transformer that has a first side connected to a half bridge circuit or a full bridge circuit and a second side connected to a load side of a discharge lamp. Such an inverter essentially includes a plurality of protection circuits for preventing a transformer from generating an over voltage when startup or open lamp occurs.

The protection circuit can include an open lamp regulation (OLR) circuit and an open lamp protection (OLP) circuit. The open lamp regulation circuit and the open lamp protection circuit operate using a voltage feedback signal or a current feedback signal at the second side of the transformer and include diodes. However, such protection circuits need a lot of external elements such as diodes because the protection circuits are connected to each of a plurality of discharge lamps that form a load side of a discharge lamp. Therefore, the protection circuit occupies a large area in the inverter, and the unit cost of the inverter increases.

The above information disclosed in this Background section is only for enhancement of understanding of the background of the invention and therefore it may contain information that does not form the prior art that is already known in this country to a person of ordinary skill in the art.

SUMMARY

Briefly and generally, embodiments include an inverter driver, and a lamp driver having the same, which include a protection circuit with a reduced number of external elements.

An exemplary embodiment includes a lamp driver including a plurality of discharge lamps, an inverter, and an inverter driver. The inverter converts an input voltage to be driving voltages for the plurality of discharge lamps. The inverter driver is formed in single integrated circuit. The inverter driver controls the inverter, and senses an abnormal operation of the plurality of discharge lamps based on a plurality of first feedback voltages corresponding to the driving voltages supplied to the plurality of discharge lamps and a plurality of second feedback voltages corresponding to a current flowing through the plurality of discharge lamps. Another embodiment of the present invention provides an inverter driver for driving an inverter supplying driving voltages to a plurality of discharge lamps. The inverter driver includes a voltage detector, a current detector, and a protection circuit controller. The voltage detector detects a first maximum value and a first minimum value from a plurality of first feedback voltages corresponding to driving voltages supplied to the plurality of discharge lamps. The current detector detects a second maximum value and a second minimum value from a plurality of second feedback voltages corresponding to currents flowing through the plurality of discharge lamps. The protection circuit controller senses abnormal operations of the inverter based on at least one of the first maximum value, the second maximum value, the first minimum value, and the second minimum value. The voltage detector, the current detector, and the protection circuit unit may be formed in a single integrated circuit.

Since the inverter driver of the above embodiment can function as a protection circuit, the number of external elements forming the protection circuit may be reduced. Accordingly, an area occupied by the inverter is reduced, and the unit cost of the inverter is also reduced.

DETAILED DESCRIPTION

Figure 1:
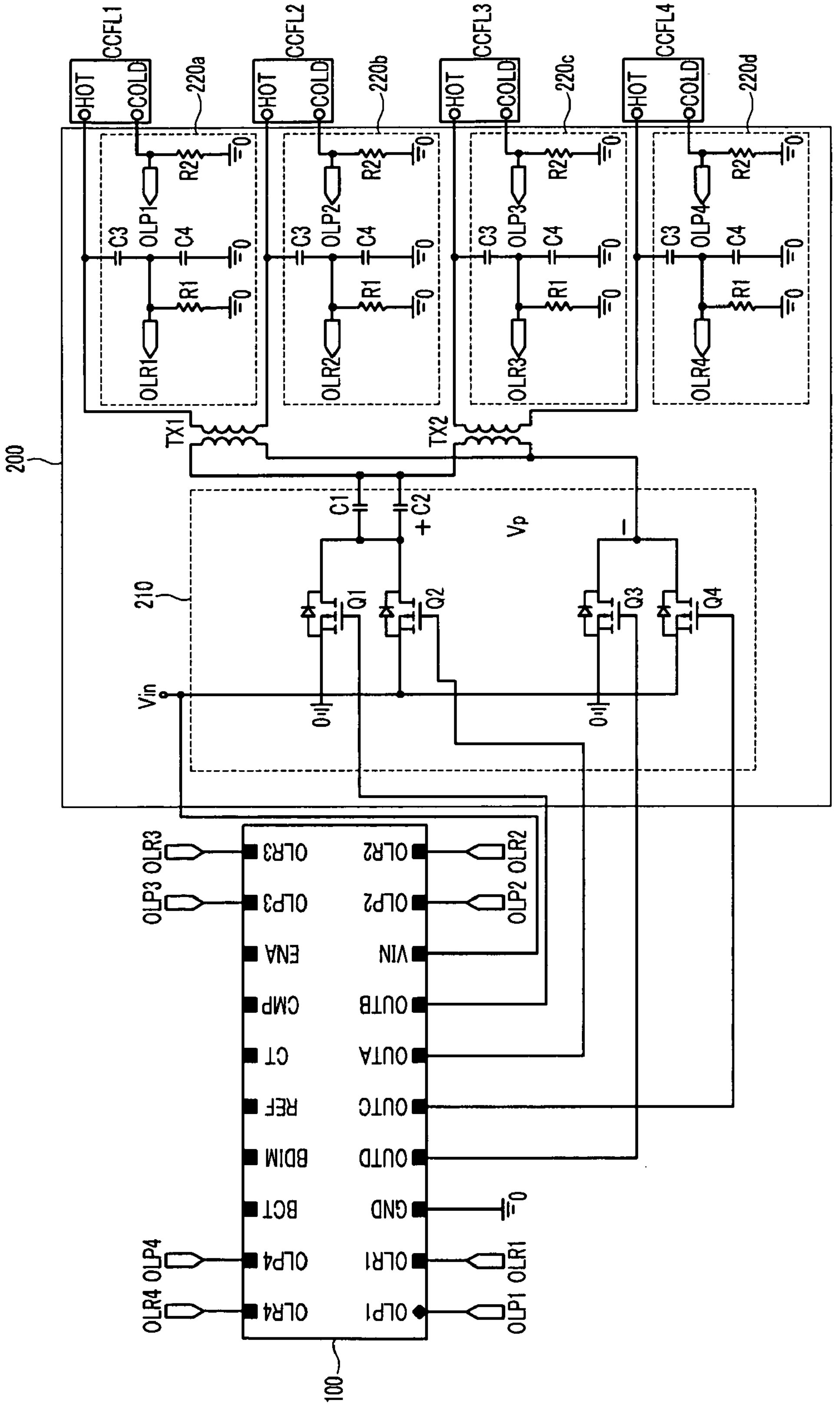
FIG. 1 is a block diagram illustrating a lamp driver.

In the following detailed description, only certain exemplary embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

FIG. 1 is a block diagram illustrating an embodiment of a lamp driver. The lamp driver may include an inverter driver 100, an inverter 200, and discharge lamps CCFL1-CCFL4.

The inverter driver 100 may be formed in a single integrated circuit. The inverter driver 100 may include an input terminal VIN, an enable terminal ENA, a ground terminal GND, feedback terminals OLR1-OLR4 and OLP1-OLP4, an error compensation terminal CMP, oscillator control terminals CT and BCT, a dimming terminal BDIM, and a reference voltage terminal REF. The inverter driver 100 can control the inverter 200 by generating a control signal that turns on/off a switching element of the inverter 200 when a DC voltage Vin is input through the input terminal VIN. Also, the inverter driver 100 can receive voltages that are supplied to the discharge lamps CCFL1 to CCFL4 and a current that flows through the discharge lamps CCFL1 to CCFL4 as feedback, and control a duty ratio of a control signal that turns on/off the switching element of the inverter 200. Here, a time of turning on/off the switching element of the inverter 200 may change according to the duty ratio of the control signal. Accordingly, the voltage and the current supplied to the discharge lamps CCFL1 to CCLF4 may be controlled.

The inverter driver 100 can detect the maximum value and the minimum value from a plurality of feedback currents and voltages and control the on/off of the switching device of the inverter 200 based on the detected maximum value and the detected minimum value.

The inverter 200 may include a switching circuit unit 210, transformers TX1 and TX2, and feedback units 220*a* to 220*d*. The switching circuit unit 210 can receive a DC voltage Vin and output an essentially square wave voltage to the transformers TX1 and TX2 by the on/off operation of the switching circuit. Different embodiments of the switching circuit can be of the push-pull type, the half-bridge type and the full-bridge type, among others. FIG. 1 shows a full-bridge type switching circuit.

The switching circuit unit 210 having the full-bridge type switching circuit may include transistors Q1 to Q4 and capacitors C1 and C2. The transistors Q1 and Q3 can be N-channel transistors, and the transistors Q2 and Q4 P-channel transistors. In other embodiments the opposite architecture can be used. The gates of the transistors Q1 to Q4 may be respectively connected to the output terminals OUTB, OUTA, OUTD, and OUTC of the inverter driver 100. A DC voltage Vin can be input from the VIN terminal of the inverter driver 100 to sources of the transistors Q2 and Q4. Sources of the transistors Q1 and Q3 can be connected to the ground. A drain of the transistor Q1 can be connected to a drain of the transistor Q2, and a drain of the transistor Q3 can be connected to a drain of the transistor Q4. The capacitors C1 and C2 can be connected in parallel between drains of the transistors Q1 and Q2 and first terminals of the primary coils of the transformers TX1 and TX2. Drains of the transistors Q3 and Q4 can be connected to second terminals of the primary coils of the transformers TX1 and TX2. Resistors may be connected between a source of the transistor Q2 and a gate of the transistor Q2 and between a source of the transistor Q4 and a gate of the transistor Q4. Although two capacitors C1 and C2 are shown in parallel in FIG. 1, in other embodiments the number of capacitors can be one or more than two, coupled in parallel or in series.

The transformers TX1 and TX2 can convert an essentially square wave voltage, received from the switching circuit unit 210, to an AC voltage, then boost the AC voltage, finally supply the boosted AC voltage to the discharge lamps CCFL1 to CCFL4. Hereinafter, the voltage boosted from the transformers TX1 and TX2 will be referred to as a driving voltage.

The switching circuit unit 210 may generate an essentially square wave voltage by the on/off operations of the transistors Q1 to Q4, and generate an AC voltage while inducing resonance of the capacitors C3 and C4 and the transformers TX1 and TX2. The transformers TX1 and TX2 boost the generated AC voltage and supply a driving voltage to the discharge lamps CCFL1 to CCFL4.

The switching circuit unit 210 described in relation to FIG. 1 is but one embodiment. Other embodiments may include different switching circuit units.

Figure 2:
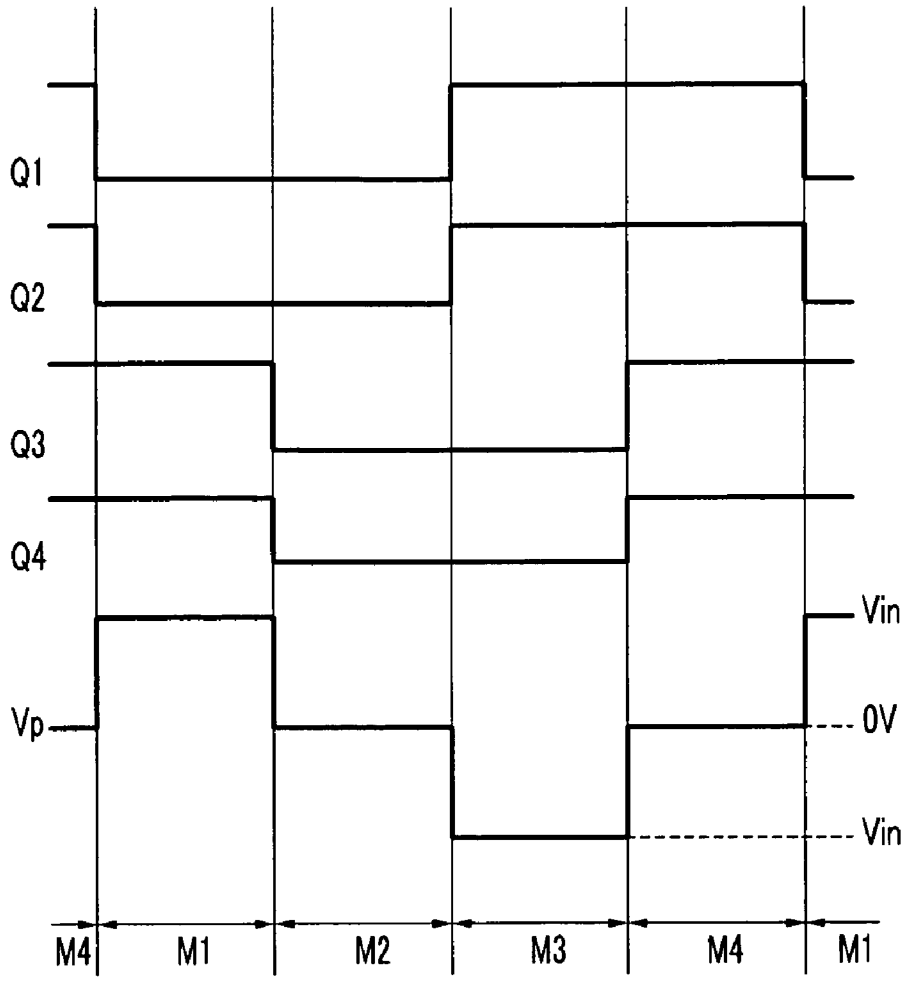
FIG. 2 is a timing diagram illustrating the operation of a switching circuit in a switching circuit unit shown in FIG. 1.

FIG. 2 illustrates the operation of the inverter with the help of signal waveforms. At a first time T1, the transistors Q2 and Q3 can be turned on and the transistors Q1 and Q4 turned off in response to control signals from the output terminals OUTA, OUTD, and OUTB, and OUTC of the inverter driver 100, respectively. Then, a Vp voltage, which is difference between a shared node of the drains of the transistor Q1 and Q2 and a shared node of the drains of the transistor Q3 and Q4, can be transformed to a DC voltage Vin.

At time T2, the transistors Q2 and Q4 can be turned on and the transistors Q1 and Q3 can be turned off in response to the control signals from the output terminals OUTA, OUTC, and OUTB, OUTD of the inverter driver 100, respectively. At this time T2 the Vp voltage can become essentially 0V.

At time T3 the transistors Q1 and Q4 can be turned on and the transistors Q2 and Q3 can be turned off in response to the control signals from the output terminals OUTB, OUTC, and OUTA, OUTD of the inverter driver 100, respectively. At this time T3, the Vp voltage can become the negative of the input voltage: −Vin.

At time T4, the transistors Q1 and Q3 can be turned on and the transistors Q2 and Q4 can be turned off in response to the control signals from the output terminals OUTB, OUTD, OUTA, and OUTC of the inverter driver 100, respectively. At this time T4 the Vp voltage can become essentially 0V. A square wave voltage can be generated by repeatedly performing the operations described above in relation to times T1-T4.

The feedback units 220*a* to 220*d* may feed driving voltages of the corresponding discharge lamps CCFL1 to CCLF4 and voltages corresponding to currents flowing through the discharge lamps CCFL1 to CCFL4 back to the inverter driver 100. As an example, feedback unit 220*a* may include capacitors C3 and C4 and resistors R1 and R2. The capacitors C3 and C4 may be coupled in series between a HOT terminal of the discharge lamp CCFL1 and the ground. A node between the two capacitors C3 and C4 can be connected to the feedback terminal OLR1 of the inverter driver 100. Thus, the voltage of the capacitors C3 and C4 can also be applied to the HOT terminal, which drives the discharge lamp CCFL1. In other embodiments, two resistors may be connected in series between the HOT terminal and the ground of the discharge lamp CCFL instead of the two capacitors C3 and C4, and a voltage divided by two resistors may be input to the feedback terminal OLR1 of the inverter driver 100.

Further, in feedback unit 220*a* a resistor R2 may be connected between a COLD terminal of the discharge lamp CCFL1 and the ground. The node between the COLD terminal of the discharge lamp CCFL1 and R2 can be connected to the feedback terminal OLP1 of the inverter driver 100. Therefore, a voltage corresponding to a current flowing through the discharge lamp CCFL1 can be input to the feedback terminal OLP1 of the inverter driver. Equivalent designs can be applied in the other feedback units 220*b* to 220*d*.

Also, a resistor R1 may be connected between the node between the capacitors C3 and C4 and the ground in some embodiments, and omitted in other embodiments.

In some embodiments the feedback units 220*b* to 220*d* can be essentially identical to feedback unit 220*a*. In the feedback units 220*b* to 220*d*, the nodes between the capacitors C3 and C4 may be connected to the corresponding feedback terminals OLR2 to OLR4 of the inverter driver 100. Also, the nodes between the COLD terminal of the discharge lamps CCFL2 to CCFL4 and the resistors R2 can be connected to the feedback terminals OLP2 to OPL4 of the inverter driver 100.

Hereinafter, a driving voltage that is applied to the discharge lamps CCFL1 to CCFL4, divided by the capacitors C3 and C4 and is input to the feedback terminals OLR1 to OLR4 will be referred to as a first feedback voltage, and a voltage corresponding to a current flowing through the discharge lamps CCFL1 to CCFL4 will be referred to as a second feedback voltage.

The HOT terminal of the discharge lamp CCFL1 can be connected to the first end of the secondary coil of the transformer TX1 and the HOT terminal of the discharge lamp CCFL2 can be connected to the second end of the secondary coil of the transformer TX1. The HOT terminal of the discharge lamp CCFL3 can be connected to the first end of the secondary coil of the transformer TX2, and the HOT terminal of the discharge lamp CCFL4 can be connected to the second end of the secondary coil of the transformer TX2. The COLD terminal of the discharge lamps CCFL1 to CCFL 4 can be connected to a ground through the corresponding resistors R2. The discharge lamps CCFL1 to CCFL4 can be turned on by receiving the driving voltage generated by the transformers TX1 and TX2.

Figure 3:
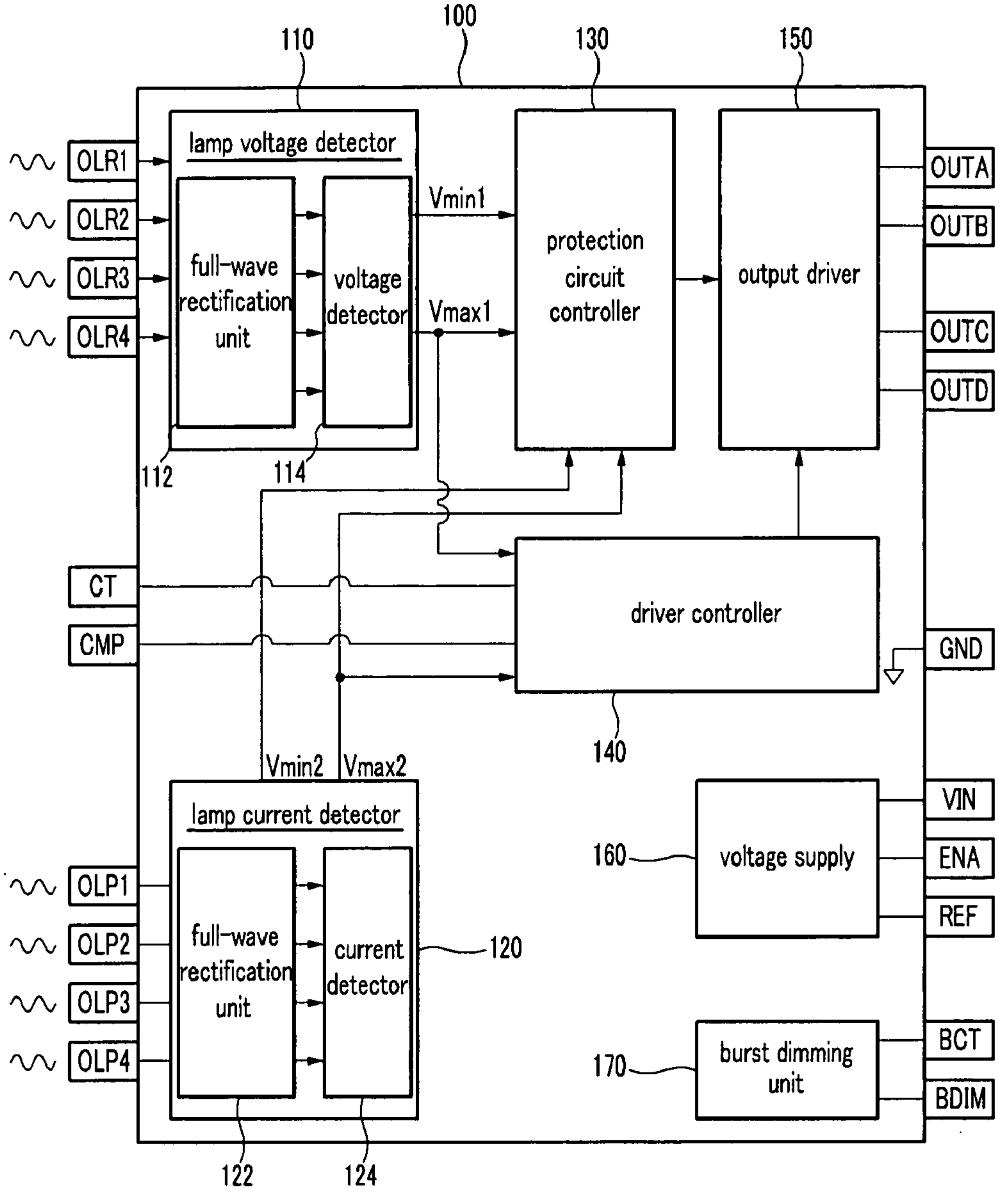
FIG. 3 is a schematic block diagram illustrating an inverter driver.

FIG. 3 is a schematic block diagram illustrating an inverter driver 100. The inverter driver 100 may include a lamp voltage detector 110, a lamp current detector 120, a protection circuit controller 130, a driver controller 140, an output driver 150, a voltage supply 160, and a burst dimming unit 170.

The lamp voltage detector 110 may include a full-wave rectification unit 112 and a voltage detector 114. The full-wave rectification unit 112 can rectify the first feedback voltages input through the feedback terminals OLR1 to OLR4, and the voltage detector 114 can detect the maximum value Vmax1 and the minimum value Vmin1 of the rectified first feedback voltages.

The lamp current detector 120 can include a full-wave rectification unit 122 and a current detector 124. The full-wave rectification unit 122 can rectify the second feedback voltage input through the feedback terminals OLP1 to OLP4 and the current detector 124 can detect the maximum value Vmax2 and the minimum value Vmin2 of the rectified second feedback voltage. Since the second feedback voltage is a voltage corresponding to a current that flows through the discharge lamps CCFL1 to CCFL4, the lamp current detector 120 can detect the current of the discharge lamps CCFL1 to CCFL4 as a voltage.

The protection circuit controller 130 can interrupt the inverter 200 to protect the inverter 200 from various fault conditions, including damage, poor contact, and overcurrent conditions. These conditions can be identified from the maximum voltage values Vmax1 and Vmax2 and the minimum voltage values Vmin1 and Vmin2 from the lamp voltage detector 110 and the lamp current detector 120. In response to identifying the above fault conditions, the protection circuit controller 130 can generate a control signal to interrupt the operation of the inverter 200 and apply the generated control signal to the output driver 150 when the discharge lamp is damaged, when loose contact occurs, and when overcurrent conditions occur.

The driver controller 140 can generate a control signal for driving the switching circuit unit 210 and the transistors Q1 to Q4 of the inverter 200, and can apply the generated control signal to the output driver 150. The driver controller 140 can stabilize a driving voltage supplied to the discharge lamps CCFL1 to CCFL4 and a current flowing through the discharge lamps CCFL1 to CCFL4 by controlling a duty ratio of the transistors Q1 to Q4 based on the maximum values Vmax1 and Vmax2 of the first and second feedback voltages.

The output driver 150 can turn on and off the transistors Q1 to Q4 of the switching circuit unit 210 by applying a voltage and a current to gates of the transistors Q1 to Q4 through the output terminals OUTA to OUTD according to the control signal from the driving controller 140. Also, the output driver 150 can apply a voltage that turns off the transistors Q1 to Q4 to the gates of the transistors Q1 to Q4 when the output driver 150 receives a control signal that interrupts the inverter 200 from the protection circuit controller 130.

The voltage supply 160 can supply a driving voltage to the inverter driver 100 for driving the inverter driver 100 based on the voltages input through an input terminal VIN, a reference voltage terminal REF, and an enable terminal ENA.

The burst dimming unit 170 can generate a burst dimming pulse by comparing a triangle waveform or a sawtooth waveform of a voltage generated from the voltage input through an oscillator control terminal BCT with a voltage input through the dimming terminal BDIM and outputs the generated burst dimming pulse.

Figure 4:
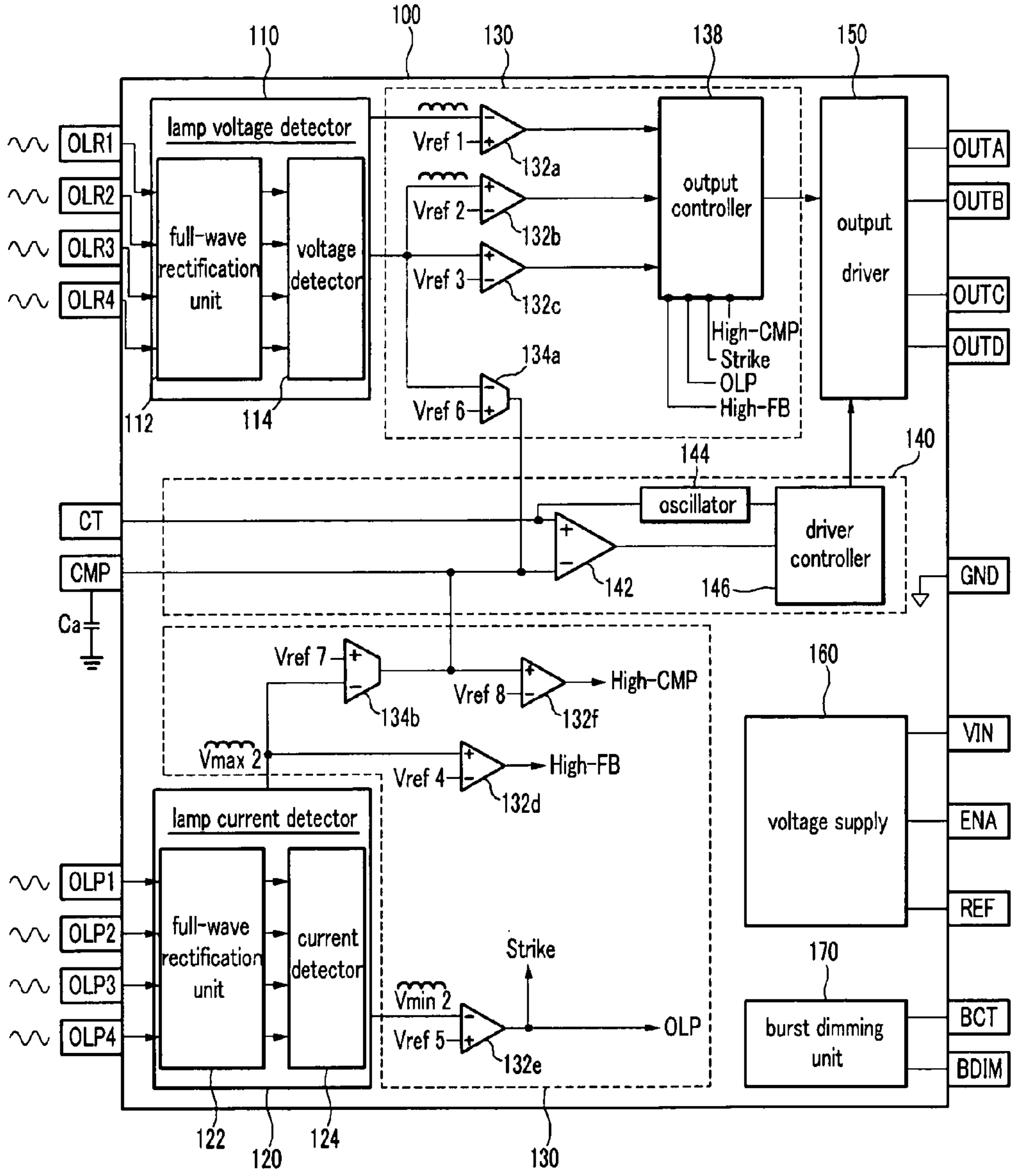
FIG. 4 is a circuit diagram of an inverter driver.

FIG. 4 illustrates a related embodiment of the inverter driver 100 in more detail. In particular, it shows that the burst dimming pulse can be input into an amplifier 134*b* and a capacitor Ca, which is connected to an error compensation terminal CMP and is charged or discharged according to the output voltage of the amplifier 134*b*.

The protection circuit controller 130 can include comparators 132*a* to 132*f*, amplifiers 134*a* and 134*b*, and an output controller 138.

The inverter driver 100 can protect the inverter against fault conditions related to the lamp voltage with the help of the lamp voltage detector 110. The comparator 132*a* can include an inverting terminal (−) for receiving the minimum value Vmin of the first feedback voltage from the voltage detector 114, a non-inverting terminal (+) for receiving a reference value Vref1, and an output terminal connected to the output controller 138. The comparator 132*a* can output a high level pulse to the output controller 138 if the minimum voltage Vmin is smaller than the reference voltage Vref1. Conversely, the comparator 132*a* can output a low level pulse to the output controller 138 if the minimum voltage Vmin is larger than the reference voltage Vref1. In general, if the discharge lamps CCFL1 to CCFL4 become shorted, the voltage divided by the capacitors C3 and C4 can become low, possible even 0V. Therefore, if the value of the reference voltage Vref1 is set higher than 0V, such as 0.3V, a short condition of a lamp can be sensed based on the pulse output of the comparator 132*a*.

The comparator 132*b* may include a non-inverting terminal (+) for receiving the maximum voltage Vmax1 of the first feedback voltage from the voltage detector 114, an inverting terminal (−) for receiving a reference voltage Vref2, and an output terminal connected to the output controller 138. The comparator 132*b* can output a high level pulse to the output controller 138 if the maximum voltage Vmax1 is larger than a reference voltage Vref2. Conversely, the comparator 132*b* can output a low level pulse to the output controller 138 if the maximum voltage Vmax1 is smaller than the reference voltage Vref2.

The comparator 132*c* can include a non-inverting terminal (+) for receiving the maximum voltage Vmax1 of the first feedback voltage from the voltage detector 114, an inverting terminal (−) for receiving a reference voltage Vref3, and an output terminal connected to the output controller 138. The comparator 132*c* can output a high level pulse to the output controller 138 if the maximum voltage Vmax1 is larger than a reference voltage Vref3. Conversely, the comparator 132*c* can output a low level pulse to the output controller 138 if the maximum voltage Vmax1 is smaller than the reference voltage Vref3. Here, the reference value Vref3 may be set to be smaller than the reference value Vref2.

Lamp voltage fault conditions include the case when an arc is generated on a point of the poor contact between the secondary coils of the transformers TX1 and TX2 and the discharge lamps CCFL1 to CCFL4. In the case of such an arc a driving voltage may increase. Therefore, if the reference voltage Vref2 is set to be higher, the generation of an arc can be detected from the pulse output from the comparator 132*b*. Further, in the case of an open lamp fault condition, the voltage of the HOT terminal divided by the capacitors C3 and C4 can increase. Since this voltage is typically smaller than the voltage that generates an arc, the regulation for the open lamp fault condition can be achieved by using the reference voltage Vref3 smaller than the reference voltage Vref2.

The inverter driver 100 can protect the inverter against lamp current fault conditions with the help of lamp current detector 120. The comparator 132*d* may include a non-inverting terminal (+) for receiving the maximum voltage Vmax2 of the second feedback voltage from the current detector 124, an inverting terminal (−) for receiving a reference voltage Vref4, and an output terminal connected to the output controller 138. The comparator 132*d* can output a high level pulse to the output controller 138 if the maximum voltage Vmax2 is larger than the reference voltage Vref4. Conversely, the comparator 132*d* may output a low level pulse to the output controller 138 if the maximum voltage Vmax2 is smaller than the reference voltage Vref4. Since the second feedback voltage is a voltage corresponding to a current flowing through the discharge lamps CCFL1 to CCFL4, the overcurrent fault condition can be sensed based on the pulse output from the comparator 132*d*.

The comparator 132*e* may include an inverting terminal (−) for receiving the minimum voltage Vmin2 of the second feedback voltage detected from the current detector 124, a non-inverting terminal (+) for receiving a reference voltage Vref5, and an output terminal connected to the output controller 138. The comparator 132*e* can output a high level pulse to the output controller 138 if the minimum voltage Vmin2 is smaller than the reference voltage Vref5. Conversely, the comparator 132*e* may output a low level pulse to the output controller 138 if the minimum voltage Vmin2 is larger than the reference voltage Vref5. A strike, or initial startup, mode such as an initial startup mode and/or an open lamp can be sensed based on the pulse output from the comparator 132*e*.

The amplifier 134*a* may include an inverting terminal (−) for receiving the maximum voltage Vmax1 of the first feedback voltage detected from the voltage detector 114, a non-inverting terminal (+) for receiving a reference voltage Vref6, and an output terminal connected to the inverting terminal (−) of a comparator 142.

The amplifier 134*b* may include an inverting terminal (−) for receiving the maximum voltage Vmax2 of the second feedback voltage from the current detector 124, an non-inverting terminal (+) for receiving a reference voltage Vref7, and an output terminal connected to the inverting terminal (−) of the comparator 142 and the non-inverting terminal (+) of the comparator 132*f*. The amplifiers 134*a* and 134*b* can amplify the voltage difference between their inverting terminal (−) and the non inverting terminal (+) and output the amplified voltage difference. The amplifiers 134*a* and 134*b* can also determine a voltage at the capacitor Ca connected to the error compensation terminal CMP. The voltage input to the inverting terminal (−) of the comparator 142 can be decided by the maximum voltages Vmax1 and Vmax2 of the first and second feedback voltages. Hereinafter, the voltage input to the inverting terminal (−) of the comparator 142 will be referred to as a CMP voltage.

The comparator 132*f* can include a non-inverting terminal (+) connected to an output terminal of the amplifier 134*b*, an inverting terminal (−) for receiving a reference voltage Vref8, and an output terminal connected to the output controller 138. The comparator 132*f* may output a high level pulse to the output controller 138 if the output voltage of the amplifier 134*b* is larger than a predetermined reference voltage Vref8. Conversely, the comparator 132*f* can output a low level pulse to the output controller 138 if the output voltage of the amplifier 134*b* is smaller than the predetermined reference voltage Vref8. The reference voltage Vref8 can be set as the limit of the control range of the CMP voltage. This choice makes it possible to sense whether the CMP voltage exceeds the control range thereof.

The output controller 138 can sense the occurrence of any of the above described fault conditions, including a short of a discharge lamp, a generation of an arc, an open lamp condition, and the abnormal operation of the inverter 200, based on the pulses output from the plurality of comparators 132*a* to 132*f*. The output controller 138 can output a control signal to the output driver 150 to interrupt the regular operations of the transistors Q1 to Q4.

If one of the discharge lamps is shorted, the comparator 132*a* can output a high level pulse because the voltage divided by the capacitors C3 and C4 may have became about 0V. If the pulse output of the comparator 132*a* becomes a high level for a predetermined time, the output controller 138 can sense the shorted lamp condition and output a control signal to the output driver 150 to interrupt the regular operation of the inverter 200.

If an arc is generated e.g. between a coil of one of the transformers TX1 and TX2 and one of the discharge lamps CCFL1 to CCFL4, the driving voltage of the corresponding discharge lamp can increase and the voltage divided by the capacitors C3 and C4 can also increase. Thus, if an arc is generated, the comparator 132*b* can output a high level pulse. If the comparator 132*b* outputs a high level pulse, the output controller 138 may sense the generation of an arc and output a control signal to the output driver 150 to interrupt the regular operation of the inverter 200.

If an open lamp condition occurs, the voltage divided by the capacitors C3 and C4 can also increase. Accordingly, the comparator 132*c* can output a high level pulse. In response, the output controller 138 can sense the open lamp condition and output a control signal to the output driver 150 to interrupt the regular operation of the inverter 200 if the comparator 132*c* outputs the high level pulse more than a predetermined number of times of a predetermined duration.

If an overcurrent flows to at least one of the discharge lamps CCFL1 to CCFL4, the second feedback voltage may increase. Accordingly, the comparator 132*d* may output a high level pulse. In response, the output controller 138 can sense the overcurrent and output a control signal to the output driver 150 to interrupt the regular operation of the inverter 200.

If an open lamp condition occurs, the second feedback voltage can also become about 0V because no current flows through at least one of the discharge lamps CCFL1 to CCFL4. Accordingly, the comparator 132*e* may output a high level pulse. In response, the output controller 138 can sense the open lamp condition and output a control signal to the output driver 150 to interrupt the regular operation of the inverter 200 if the comparator 132*e* outputs a high level pulse for a predetermined time.

The comparator 132*e* may also output a high level pulse because only a small current flows through the discharge lamps CCFL1 to CCFL4 when the lamp driver 100 starts its operation. Since no open lamp condition occurs during start-up, the output controller 138 can be configured to ignore the high level pulse output from the comparator 132*e* for a predetermined time.

The comparator 132*f* may output a high level pulse if a voltage output from the amplifier 134*b* falls outside a control range of a CMP voltage. In response, the output controller 138 can sense that the voltage is outside the CMP voltage control range and output a control signal to the output driver 150 to interrupt the regular operations of the inverter 200.

The output controller 138 can also output a control signal to the output driver 150 to interrupt the regular operations of the inverter 200 if an internal temperature of the inverter driver 100 is higher than a predetermined temperature.

The driver controller 140 can include a comparator 142, an oscillator 144, and a controller 146. The comparator 142 may include an inverting terminal (−) to receive a voltage input through the error compensation terminal CMP, a non-inverting terminal (+) to receive a voltage input through an oscillator control terminal CT, and an output terminal connected to the controller 146. The voltage input through the error compensation terminal (CMP) may be called the error compensation voltage. The voltage input through the oscillator control terminal CT may be a periodic signal, such as a triangle wave or a sawtooth wave. The comparator 142 can generate a control signal to control the gates of the transistors Q1 to Q4 by comparing the CMP voltage with the triangle wave or the sawtooth wave voltage and outputting the generated control signal to the controller 146. The controller 146 can control the duty ratio of the control signal from the comparator 142 and a signal generated by the oscillator 144 from the triangle wave or the sawtooth wave, and output a driver signal according to the controlled duty ratio to the output driver 150.

Since the protection circuit can be integrated within the inverter driver 100, it is not necessary to have an external device for protecting the inverter 200. Therefore, the inverter 200 can have a reduced size and the unit cost thereof can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A lamp driver comprising:

an inverter for converting an input voltage to driving voltages for a plurality of discharge lamps; and an inverter driver configured to control the inverter, and to sense an abnormal operation of the discharge lamps based on a first set of feedback voltages corresponding to the driving voltages applied to the plurality of discharge lamps and a second set of feedback voltages corresponding to currents flowing through the plurality of discharge lamps;

wherein the inverter driver comprises:

a voltage detector, configured to detect a first maximum value and a first minimum value from the first set of feedback voltages;

a current detector, configured to detect a second maximum value and a second minimum value from the second set of feedback voltages; and a protection circuit controller, configured to sense abnormal operations of the discharge lamps based on at least one of the first maximum value, first minimum value, second maximum value, and second minimum value, and to control the inverter based on the sensed result.

2. The lamp driver of claim 1, wherein the inverter driver further comprises:

a first full-wave rectification unit, configured to rectify the first set of feedback voltages and to output the rectified first set of feedback voltages to the voltage detector; and a second full-wave rectification unit, configured to rectify the second set of feedback voltages and to output the rectified second set of feedback voltage to the current detector.

3. The lamp driver of claim 2, wherein the protection circuit controller comprises:

at least one of:

a first comparator, configured to compare the first maximum value and the first reference value, to generate a first pulse based on the comparison result, and to output the generated first pulse, and a second comparator, configured to compare the first minimum value and a second reference value, smaller than the first reference value, to generate a second pulse based on the comparing result, and to output the generated second pulse; and at least one of:

a third comparator, configured to compare the second maximum value with the third reference value, to generate a third pulse based on the comparison result, and to output the generated third pulse, and a fourth comparator, configured to compare the second minimum value with a fourth reference value, smaller than the third reference value, to generate a fourth pulse based on the comparison result, and to output the generated fourth pulse; and a protection circuit controller, configured to sense an abnormal operation of the discharge lamps based on the first to fourth pulses.

4. The lamp driver of claim 1, wherein the inverter driver further comprises:

a driver controller, configured to generate a control signal to drive the inverter based on the first and second maximum values; and an output driver, configured to drive the inverter according to the control signal and to interrupt an operation of the inverter in response to the control of the protection circuit controller.

5. The lamp driver of claim 1, wherein the inverter comprises:

a switching circuit unit, configured to generate a square wave voltage from the input voltage and to output the generated square wave voltage; and a transformer having a primary coil coupled to the switching circuit unit and a secondary coil connected to the discharge lamps, and configured to convert the square wave voltage into the driving voltage.

6. The lamp driver of claim 5, wherein the switching circuit unit comprises:

first and second transistors connected in series between a power source supplying the input voltage and a ground terminal and having a node connected to a first end of the primary coil; and third and fourth transistors connected in series between the power source and the ground end and having a node connected to a second end of the primary coil.

7. The lamp driver of claim 1, wherein one feedback voltage in the first set of feedback voltages is a voltage divided by a first and second capacitor that are coupled in series to a first terminal of one of the plurality of discharge lamps, and one feedback voltage in the second set of feedback voltages corresponds to a voltage across a resistor connected to a second terminal of the one of the plurality of discharge lamps.

8. An inverter driver, configured to drive an inverter to supply driving voltages to a plurality discharge lamps, the inverter driver comprising:

a voltage detector, configured to detect a first maximum value and a first minimum value from a first set of feedback voltages corresponding to the driving voltages supplied to the plurality of discharge lamps;

a current detector, configured to detect a second maximum value and a second minimum value from a second set of feedback voltages corresponding to currents flowing through the plurality of discharge lamps; and a protection circuit controller, configured to sense an abnormal operation of the inverter based on at least one of the first maximum value, second maximum value, first minimum value, and second minimum value, wherein the voltage detector, the current detector, and the protection circuit unit are formed in a single integrated circuit.

9. The inverter driver of claim 8, further comprising:

a driver controller, configured to generate a control signal for driving the inverter, and to control a duty ratio of the control signal based on the first and second maximum values; and an output driver, configured to drive the inverter according to the generated control signal, and to control the inverter according to the control of the protection circuit.

10. The inverter driver of claim 9, wherein the protection circuit controller includes:

a plurality of comparators, configured to compare the detected first maximum value, the detected second maximum value, the detected first minimum value, and the detected second minimum value with each of the reference values; and a protection circuit controller, configured to control the inverter by sensing an abnormal operation of the inverter based on the comparison results from the comparators.

11. The inverter driver of claim 8, further comprising:

a first full-wave rectification unit, configured to rectify the first set of feedback voltages and to output the rectified first set of feedback voltages to the voltage detector; and a second full-wave rectification unit, configured to rectify the second set of feedback voltages and to output the rectified second set of feedback voltages to the current detector.

12. The lamp driver of claim 1, wherein the inverter driver is formed in a single integrated circuit.

* * * * *